(12) United States Patent
Dittenhofer et al.

(10) Patent No.: US 7,011,023 B2
(45) Date of Patent: Mar. 14, 2006

(54) BEARING ARRANGEMENT FOR CYLINDERS, ROLLS OR DRUMS

(75) Inventors: Thomas Dittenhofer, Riedback (DE); Stephan Popp, Emskirchen (DE); Klaus-Peter Zeilinger, Cadolzburg (DE)

(73) Assignee: Ina-Schaeffler KG, (DE)

( * ) Notice: Subject to any disclaimer, the term of this patent is extended or adjusted under 35 U.S.C. 154(b) by 31 days.

(21) Appl. No.: 10/796,812

(22) Filed: Mar. 9, 2004

(65) Prior Publication Data

US 2004/0252928 A1  Dec. 16, 2004

Related U.S. Application Data

(63) Continuation of application No. PCT/EP02/10214, filed on Sep. 12, 2002.

(30) Foreign Application Priority Data

Sep. 14, 2001  (DE) ................. 101 45 322

(51) Int. Cl.
  *B41F 7/02*  (2006.01)
(52) U.S. Cl. ................. 101/218; 101/247
(58) Field of Classification Search ........ 101/216, 101/217, 218, 247, 248
  See application file for complete search history.

(56) References Cited

U.S. PATENT DOCUMENTS

| | | | |
|---|---|---|---|
| 1,925,949 A | 9/1933 | Case | |
| 2,785,021 A | 3/1957 | Whittum | |
| 3,796,471 A | 3/1974 | Holm | |
| 4,301,721 A | 11/1981 | Liessen et al. | |
| 4,309,945 A * | 1/1982 | Marion | 101/247 |
| 4,420,194 A * | 12/1983 | Asami | 384/45 |
| 5,329,849 A | 7/1994 | Roerig | |
| 5,601,021 A * | 2/1997 | Katabira et al. | 101/218 |
| 5,853,139 A | 12/1998 | Hehner et al. | |
| 5,868,071 A * | 2/1999 | Niemiro et al. | 101/218 |
| 5,899,321 A | 5/1999 | El-Ibiary | |

FOREIGN PATENT DOCUMENTS

| | | |
|---|---|---|
| AT | 2 24 662 | 12/1962 |
| DE | 21 30 278 | 1/1973 |
| DE | 31 28 628 A1 | 3/1982 |
| DE | 89 03 980.7 | 6/1989 |
| DE | 41 26 545 A1 | 2/1993 |
| DE | 195 34 651 A1 | 3/1997 |
| DE | 199 55 223 A1 | 5/2001 |
| DE | 100 08 215 A1 | 8/2001 |

* cited by examiner

Primary Examiner—Ren Yan
(74) Attorney, Agent, or Firm—Charles A. Muserlian

(57) ABSTRACT

A bearing arrangement for opposite journals of cylinders, rolls or drums having actuators that permit a displacement of the cylinders, rolls or drums in a direction perpendicular to an axis of rotation of said cylinders, rolls or drums, each of said journals being received in a frame wall via a rotary bearing for being placed against and removed from said frame wall whereby a centered rotary bearing (6) is received in a bearing housing (1), the bearing housing (1) is arranged through a linear bearing unit (7) on a connecting structure (2) for longitudinal displacement relative to the connecting structure (2), and the connecting structure (2) is connected to the frame wall (10).

6 Claims, 3 Drawing Sheets

BEARING ARRANGEMENT FOR CYLINDERS, ROLLS OR DRUMS

This application is a Continuation of PCT/EP02/10214 filed Sept. 12, 2002.

FIELD OF THE INVENTION

The invention concerns a bearing arrangement for opposite journals of cylinders, rolls or drums having actuators that permit a displacement of the cylinders, rolls or drums in a direction perpendicular to an axis of rotation of said cylinders, rolls or drums, each of said journals being received in a frame wall via a rotary bearing for being placed against and removed from said frame wall.

BACKGROUND OF THE INVENTION

Bearings of the pre-cited type for cylinders or drums of printing machines are often also configured also as eccentric bearings. One such bearing configured as a triple ring rolling bearing is disclosed in DE 41 26 545 A1. This triple ring bearing comprises an inner bearing having an inner ring that is connected to a journal of a rubber blanket cylinder and comprises an outer raceway that is concentric with the journal. The triple ring bearing further comprises an outer bearing having an outer bearing ring that is arranged in a bearing housing and comprises an inner raceway that is concentric with the bore of the bearing housing. A one-piece, eccentric intermediate ring is arranged between the inner bearing ring and the outer bearing ring and comprises raceways for the inner and outer bearings, and said intermediate ring can be pivoted in peripheral direction by actuators situated outside the bearing housing.

Between the inner bearing ring connected to the journal and the eccentric intermediate ring, and between the outer bearing ring and the eccentric intermediate ring, are arranged for giving radial support, rows of radial bearings in the form of cylindrical roller bearing rows, and at least on one axial end next to a cylindrical roller bearing row are arranged thrust bearing rows, e.g. ball bearing rows or cross roller thrust bearings in the inner bearing or ball bearing rows in the outer bearing for providing a separate support of thrust forces.

Such eccentric bearings are always used in the printing industry when several printing cylinders are arranged next to each other with their outer peripheral surfaces in contact with each other. Due to the adjustable eccentricity of the individual bearings, the cylinders can be placed against each other or separated, the aim being to obtain as straight a connecting line as possible between the cylinders. The displacement of the individual cylinders in a direction perpendicular to the axis of rotation is required when the printing operation is started or stopped.

A drawback of such eccentric bearings is that they have a large radial design space requirement especially if the movement of displacement is large. The problem is aggravated if small-diameter cylinders are used. In the extreme case, it is possible that the principle of eccentricity can no longer be utilized for the displacement of the cylinders because the bearings would then have to be larger than the cylinders to be displaced.

A further drawback is that eccentric bearings can execute a displacing movement only along a curved path. The displacing movement is rendered more difficult if several cylinders are arranged next to one another. Efforts have been made to resolve this problem through an eccentric mounting of the two journals of each cylinder. It is obvious that such a multiple eccentric mounting of individual components of a complete bearing arrangement is complicated and work-intensive and therefore expensive.

SUMMARY OF THE INVENTION

The object of the invention is therefore to avoid the mentioned drawbacks and provide a bearing arrangement for the journals of cylinders, rolls or drums that permits their displacement in a direction perpendicular to the axis of rotation in a simple manner.

The invention achieves the above object in accordance with the characterizing part of claim 1 by the fact that a centered rotary bearing is received in a bearing housing, the bearing housing is arranged through a linear bearing unit on a connecting structure for longitudinal displacement relative to the connecting structure, and the connecting structure is connected to the frame wall.

Through the inventive combination of a rotary bearing and a linear bearing for the mounting of journals of cylinders, rolls or drums, a displacement of these in a direction perpendicular to their axis of rotation is rendered possible in a simple manner. The eccentric configuration of rotary bearings that requires a large design space can thus be dispensed with. This is particularly advantageous in the case of small cylinders, rolls or drums.

Advantageous developments of the invention are described in sub-claims 2 to 8.

According to claim 2, the linear bearing unit is composed of a projection of the connecting structure, which projection is V-shaped as seen in cross-section and comprises two first running surfaces, the linear bearing unit being further composed of a corresponding V-shaped recess of the bearing housing, which recess comprises second running surfaces that are parallel to said first running surfaces, rolling elements arranged in an angled flat cage roll between said first and second running surfaces, the projection and the recess being arranged in opposing relationship on upper and lower ends of the connecting structure and of the bearing housing.

In a further embodiment according to claim 3, the linear bearing unit is composed of a projection of the connecting structure, which projection has a rectangular shape as seen in cross-section and comprises three first running surfaces, the linear bearing unit being further composed of a correspondingly configured recess of the bearing housing, which recess comprises second running surfaces that are parallel to said first running surfaces, rolling elements arranged in a flat cage roll between said first and second running surfaces, the projection and the recess being arranged in opposing relationship on upper and lower ends of the connecting structure and of the bearing housing.

According to a further additional feature given in claim 4, the journals extend through the connecting structure, and the connecting structure comprises a slot for limiting the linear movement.

According to another additional feature given in claim 5, the rotary bearing is configured as a floating bearing or as a fixed bearing. According to claim 6, the rotary bearing may be a ball bearing, a cylindrical roller bearing, a self-aligning roller bearing or a taper roller bearing.

According to claim 7, the bearing housing is equipped with a device for displacing the bearing housing.

Finally, according to claim 8, the journals are a part of a printing cylinder that is arranged in a printing machine and cooperates with at least one further cylinder situated in the printing machine.

The invention will now be described more closely with reference to one example of embodiment.

DETAILED DESCRIPTION OF THE DRAWINGS

Figure 1:
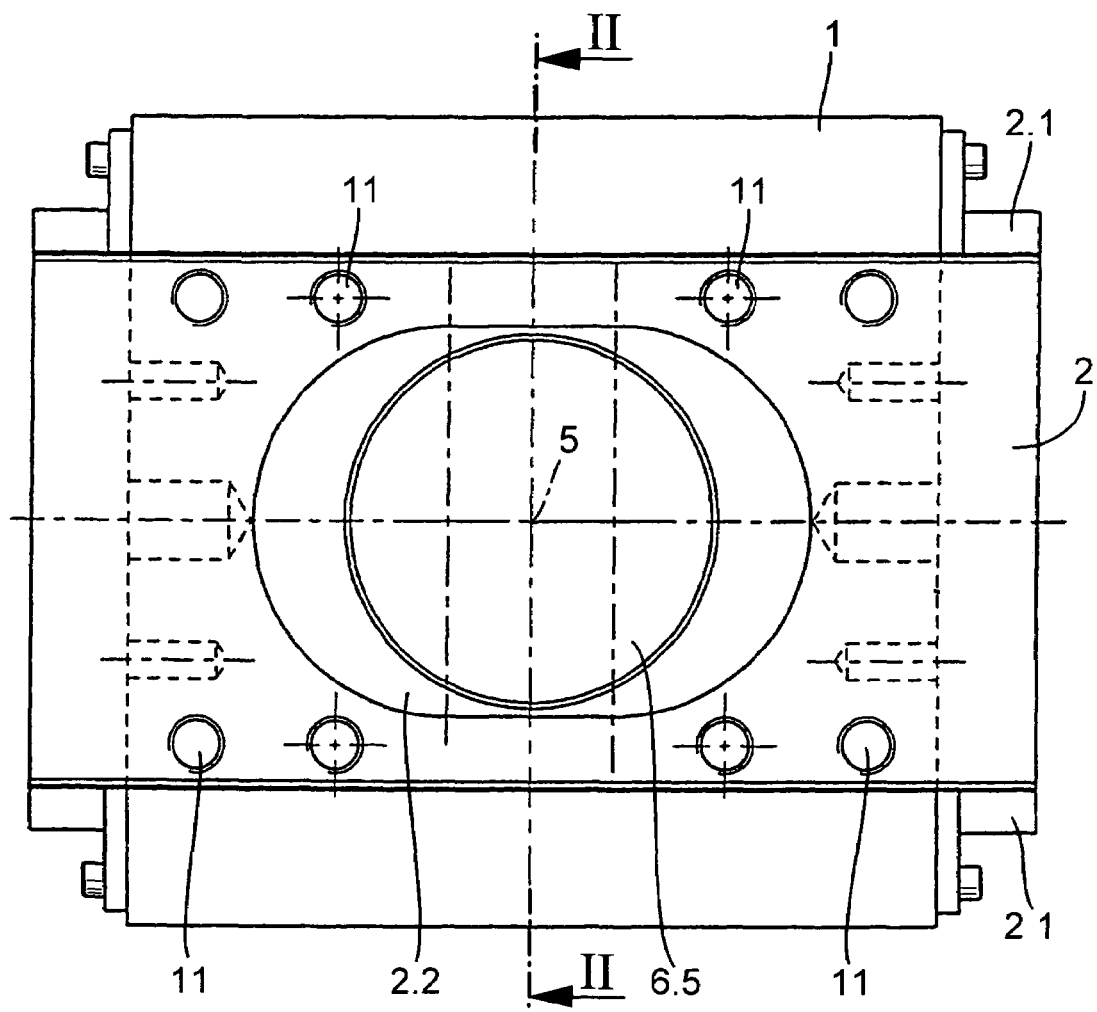
FIG. 1 is a side view of a bearing arrangement according to the invention, without a frame wall.
Figure 2:
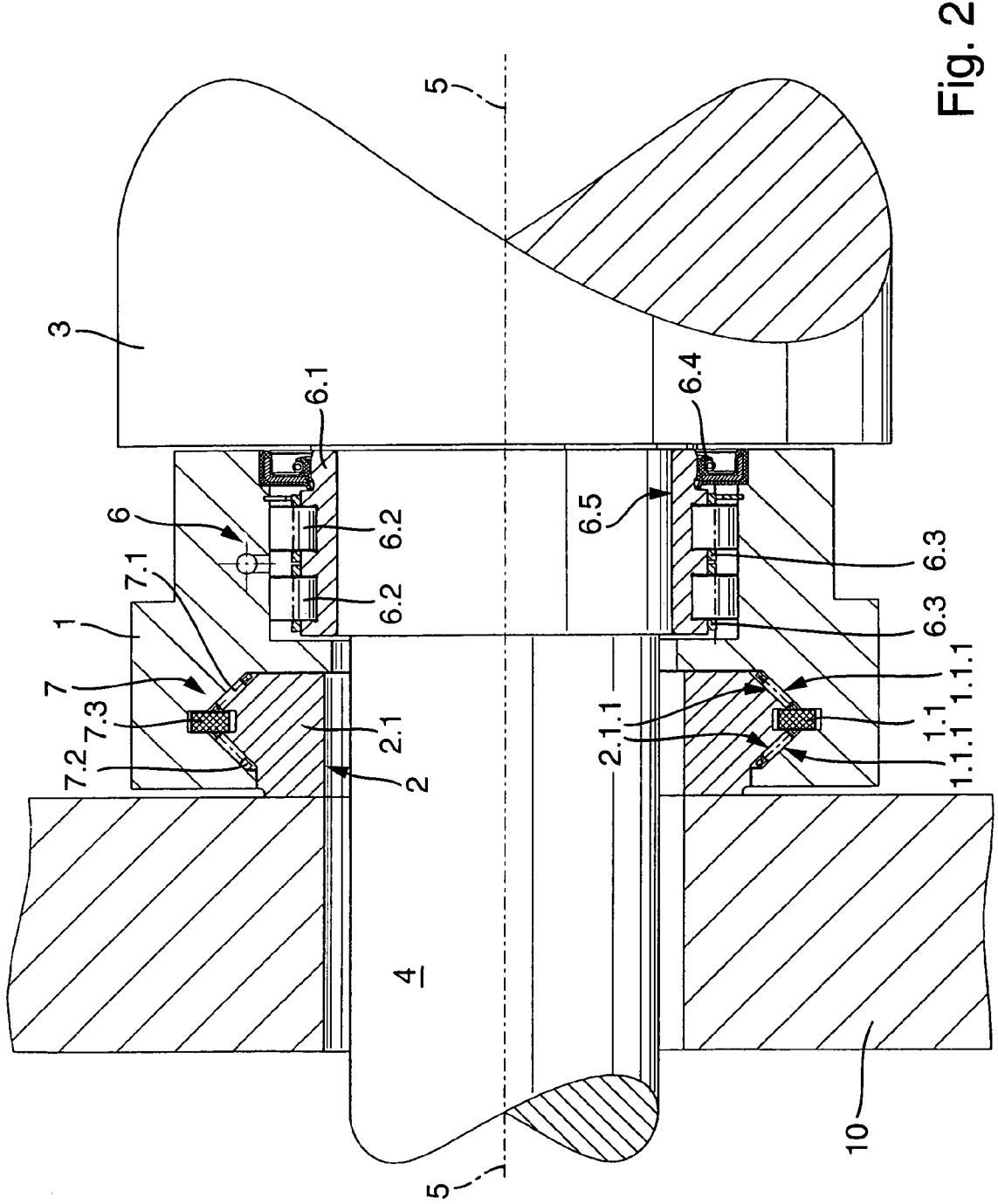
FIG. 2 shows a longitudinal section along line II—II of FIG. 1, with a frame wall.

As can be seen in FIGS. 1 to 4, the cylinder 3 comprising the stepped journal 4 is retained through a rotary bearing 6 in a bearing housing 1 on either side so that it can rotate about its axis 5, the bearing housing 1 being connected to the frame wall 10. The rotary bearing 6 is configured as a double-row cylindrical roller bearing comprising the inner ring 6.1 which forms the inner raceway for the two rows of cylindrical rollers 6.2 that are guided in respective cages 6.3. The outer raceway is formed by the bearing housing 1 itself. The bearing 6 is protected from the outside by the seal 6.4.

The bearing housing 1 comprises on each of its opposite, upper and lower ends a V-shaped recess 1.1, so that two prismatic running surfaces 1.1.1 extending at an angle to each other are formed. By varying the angle between the running surfaces 1.1.1, the ratio of tilting rigidity to radial rigidity can be optimized depending on the particular use. The opposite, i.e. the upper and the lower running surfaces 1.1.1 are situated, as a rule, in the same radial plane. But it is also possible to offset them axially to each other. This results in a different tilting rigidity depending on the direction of movement.

A further component of the bearing arrangement is the connecting structure 2 that comprises, on each of its opposite ends, a V-shaped projection 2.1 that corresponds to the V-shaped recess 1.1. The V-shaped projection 2.1 likewise forms two prismatic running surfaces 2.1.1 extending at an angle to each other, so that the cylinder 3 together with the bearing housing 1 can be moved on the connecting structure 2 through a linear bearing unit 7 in a direction perpendicular to its axis of rotation 5. The connecting structure 2 comprises a plurality of bores 11 through which it can be fixed on the frame wall 10.

The linear bearing unit 7 comprises the two rows of rolling elements 7.1 that are guided in an angled cage 7.2. The rolling element rows 7.1 roll on the raceways 1.1.1 and 2.1.1 of the bearing housing 1 and the connecting structure 2. A further component of the linear bearing is a toothed wheel 7.3 that meshes with a toothed rack of the bearing housing 1 and the connecting structure 2, so that the cage 7.2 is positively guided. As can be seen further in the figures, the rotary bearing 6 comprises the reception bore 6.5 for the journal 4 of the cylinder 3, and the diameter of this reception bore 6.5 is smaller than that of the slot 2.2 of the connecting structure 2. The different configurations of the reception bore 6.5 and the slot 2.2 assure that the path of displacement of the left and right bearing housings 1 on the connecting structure 2 is limited, i.e. the cylinder 3 can only be displaced till its journal 4 comes to abut against the left or right side of the slot 2.2.

Figure 3:
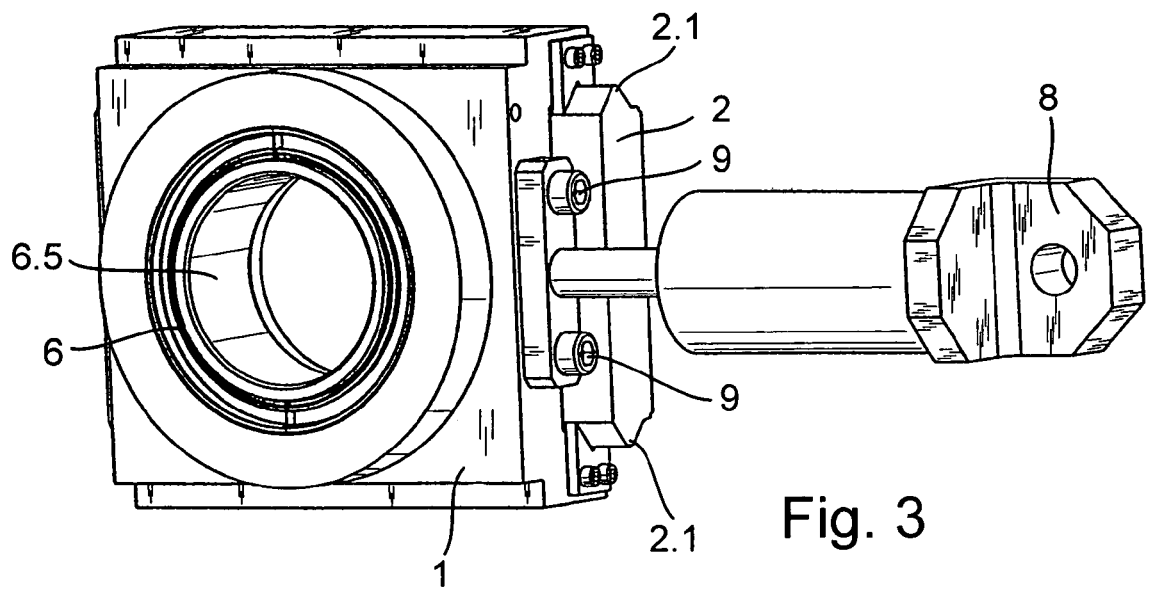
FIGS. 3 and 4 are perspective representations of the bearing arrangement according to the invention as seen from two different sides, without a frame wall.
Figure 4:
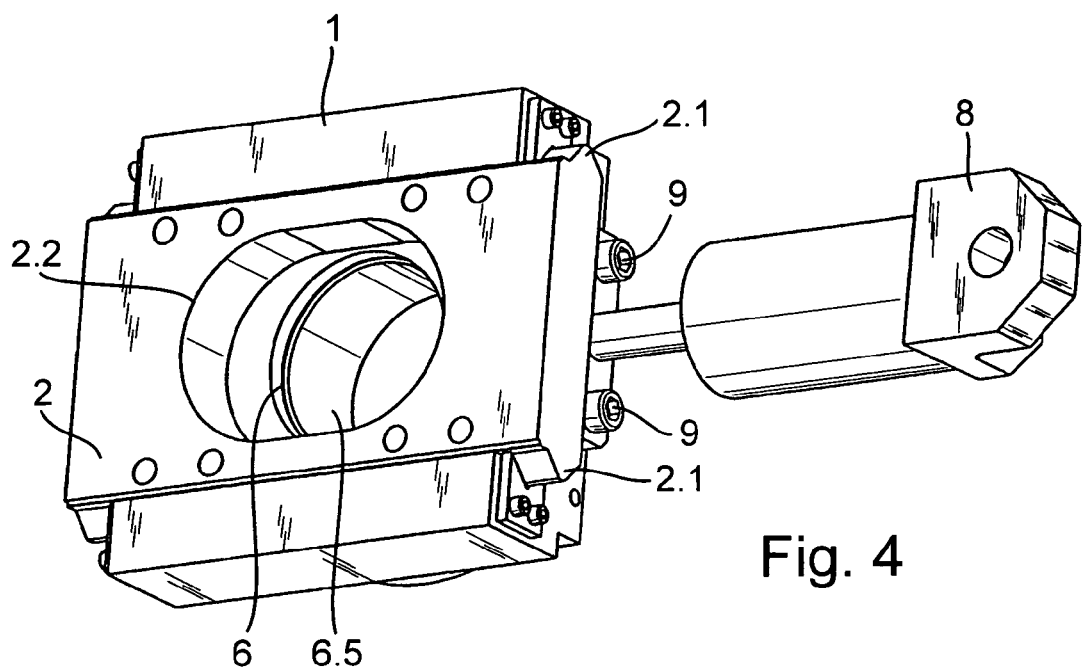

FIGS. 3 and 4 show a complete bearing arrangement for the mounting of a cylinder, FIG. 3 showing the arrangement as seen from the side of the rotary bearing 6 and FIG. 4, as seen from the side of the connecting structure 2. For realizing the displacement of the cylinder 3 on the connecting structure 2, the two spaced apart bearing housings 1 are provided, each one, with a device 8 that effects the desired displacement and is connected to the bearing housing 1 by fixing screws 9. This device can be configured, for example, as a drawbar or a pressure bar and be actuated by pneumatic, electric or hydraulic means.

REFERENCE NUMERALS

Bearing housing
1 V-shaped recess
1.1 Running surface
2 Connecting structure
2.1 V-shaped projection
2.1.1 Running surface
2.2 Slot
3 Cylinder
4 Journal
5 Axis of rotation
6 Rotary bearing
6.1 Inner ring
6.2 Cylindrical roller
6.3 Cage
6.4 Seal
6.5 Reception bore
7 Linear bearing unit
7.1 Rolling element
7.2 Cage
7.3 Toothed wheel
8 Device
9 Fixing screw
10 Frame wall
11 Bore

The invention claimed is:

1. A bearing arrangement for opposite journals (4) of cylinders (3), rolls or drums of a printing machine that cooperate with at least one further cylinder arranged in the printing machine having actuators that permit a displacement of the cylinders (3), rolls or drums in a direction perpendicular to an axis of rotation (5) of said cylinders (3), rolls or drums, each of said journals (4) being received in a frame wall (10) via a centered rotary bearing for being placed against and removed from said frame wall (10), wherein said centered rotary bearing (6) is received in a bearing housing (1), the bearing housing (1) is arranged through a rolling bearing mounted linear bearing unit (7) on a connecting structure (2) for linear displacement relative to the connecting structure (2) and the connecting structure (2) comprises a slot (2.2) for limiting the linear displacement.

2. A bearing arrangement according to claim 1, wherein the linear bearing unit (7) is composed of a projection (2.1) of the connecting structure (2), which projection (2.1) is V-shaped as seen in cross-section and comprises two first running surfaces (2.1 .1), the linear bearing unit (7) being further composed of a correspondingly V-shaped recess (1.1) of the bearing housing (1), which recess (1.1) comprises second running surfaces (1 .1 .1) that are parallel to said first running surfaces (2.1 .1), rolling elements (7.1) arranged in an angled flat cage (7.2) roll between said first and second running surfaces, the projection (2.1) and the recess (1.1) being arranged in opposing relationship on upper and lower ends of the connecting structure (2) and the bearing housing (1).

3. A bearing arrangement according to claim 1, wherein the linear bearing unit (7) is composed of a projection of the connecting structure (2), which projection has a rectangular shape as seen in cross-section and comprises three first running surfaces, the linear bearing unit (7) being further composed of a correspondingly configured recess of the bearing housing (1), which recess comprises second running surfaces that are parallel to said first running surfaces, rolling elements arranged in a flat cage roll between said first and second running surfaces, the projection and the recess being arranged in opposing relationship on upper and lower ends of the connecting structure (2) and of the bearing housing (1).

4. A bearing arrangement according to claim 1, wherein the centered rotary bearing (6) is configured as a floating bearing or as a fixed bearing.

5. A bearing arrangement according to claim 1, wherein the centered rotary bearing (6) is configured as a ball bearing, a cylindrical roller bearing, a self-aligning bearing or a taper roller bearing.

6. A bearing arrangement according to claim 1, wherein the bearing housing (1) is equipped with a device (8) for displacing the bearing housing (1).

* * * * *